United States Patent [19]
Quigley

[11] Patent Number: 5,048,441
[45] Date of Patent: Sep. 17, 1991

[54] COMPOSITE SAIL MAST WITH HIGH BENDING STRENGTH

[75] Inventor: Peter A. Quigley, Cataumet, Mass.

[73] Assignee: Fiberspar, Inc., W. Wareham, Mass.

[21] Appl. No.: 366,464

[22] Filed: Jun. 14, 1989

[51] Int. Cl.$^5$ .............. B63B 15/00; B31C 00/00; B29D 22/00; B32B 5/06
[52] U.S. Cl. .............................. 114/90; 156/173; 428/36.2; 428/36.3; 428/113; 428/284; 428/294; 428/302; 428/408; 428/902
[58] Field of Search ............... 428/36.2, 36.3, 113, 428/257, 258, 259, 902; 156/173; 114/103, 90, 91, 93

[56] References Cited

U.S. PATENT DOCUMENTS

| | | |
|---|---|---|
| Re. 29,112 | 1/1977 | Carter . |
| Re. 30,489 | 1/1981 | Abbott . |
| 2,602,766 | 7/1952 | Francis . |
| 3,007,497 | 11/1961 | Shobert . |
| 3,256,125 | 2/1964 | Tyler . |
| 4,171,626 | 10/1979 | Yates et al. ............ 428/902 |
| 4,248,062 | 2/1981 | McLain et al. ......... 156/173 |
| 4,612,241 | 9/1986 | Howard, Jr. . |
| 4,625,671 | 12/1986 | Nishimura ............. 114/103 |
| 4,657,795 | 4/1987 | Foret ..................... 428/36.3 |
| 4,668,318 | 5/1987 | Piccoli et al. . |
| 4,699,178 | 10/1987 | Washkewicz et al. . |
| 4,716,072 | 12/1987 | Kim . |
| 4,759,147 | 7/1988 | Pirazzini .............. 428/113 |

OTHER PUBLICATIONS

*Tygon Tubing*, Bulletin T-104, Norton Performance Plastics, Akron, Oh.

Primary Examiner—George F. Lesmes
Assistant Examiner—James D. Withers
Attorney, Agent, or Firm—Lahive & Cockfield

[57] ABSTRACT

A composite member features a unique ply geometry which contributes to improved bending strength. The composite is constructed of a plurality of plies, each comprising a fiber component disposed within a polymer matrix. An inner ply has a fiber component which has fibers which are circumferentially extending. An intermedaite ply has first axially extending fibers which are disposed about the circumference of the composite, as well as second axial fibers which are interwoven with helically oriented fibers and embedded in a polymer matrix. An outer layer is similar to the inner layer as it features circumferentially extending fibers which are embedded in a polymer matrix.

The composite materials may be used to manufacture a wide range of items which require light weight combined with high strength.

5 Claims, 4 Drawing Sheets

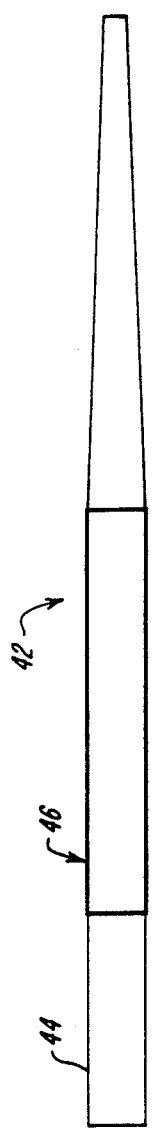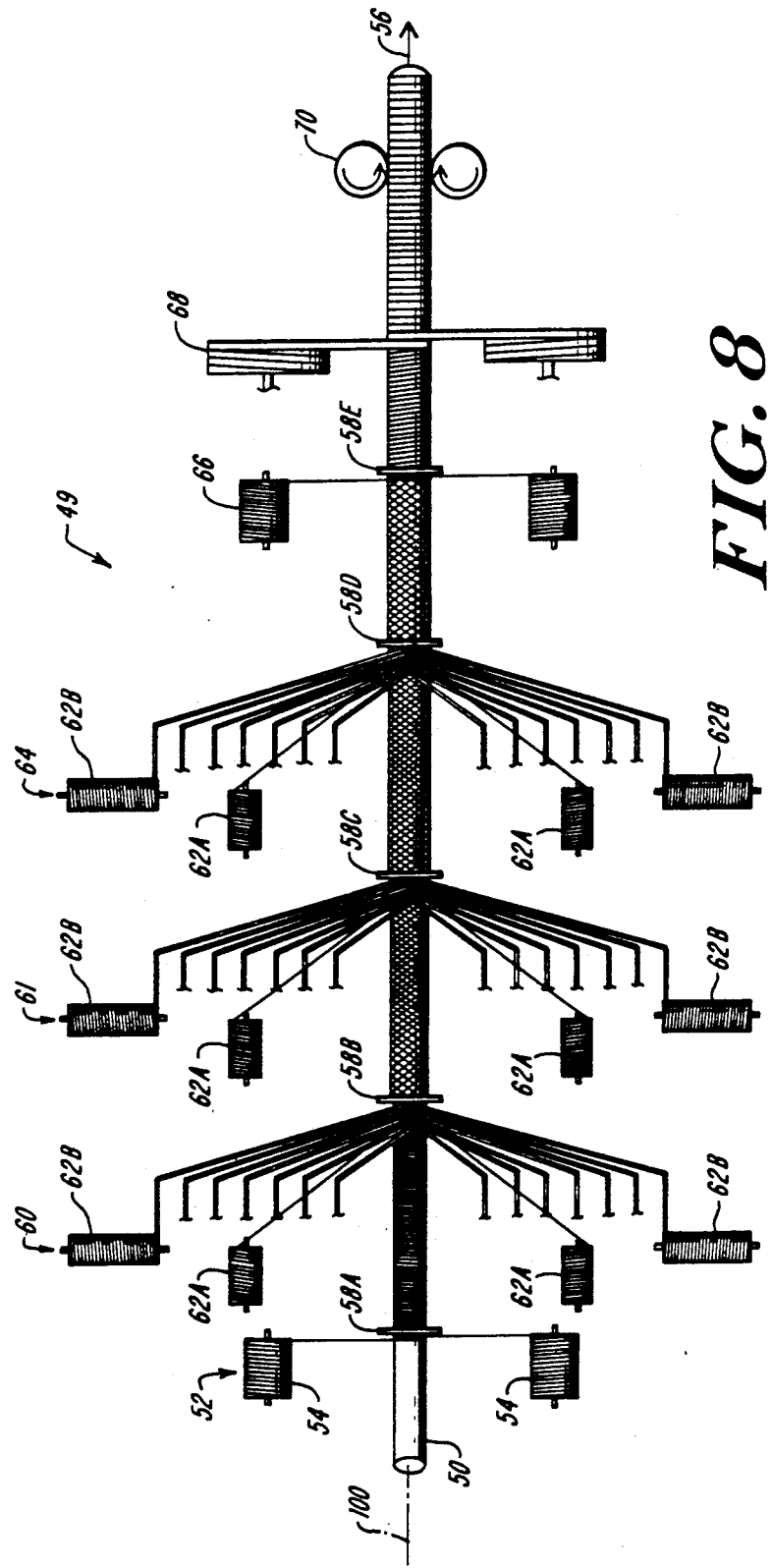

5,048,441

COMPOSITE SAIL MAST WITH HIGH BENDING STRENGTH

BACKGROUND OF THE INVENTION

The present invention relates to a composite structural member having a high bending strength. More particularly, the invention is directed to a composite structural member having a unique ply geometry and construction which contributes to a high bending strength.

A number of composite materials are well known in the art and have been used for applications requiring lightweight and high strength. Such materials are constructed of one or more plies, or layers, each of which comprises a fiber component embedded in a polymer matrix. The geometry of the fiber component within each layer contributes to the strength and other properties of the ultimate structure.

Many composite materials are susceptible to structural failure when subjected to excessive bending, compressive or torsional strains. It would be advantageous to provide a lightweight structure able to withstand greater forces.

Accordingly, an object of the present invention is to provide a composite structure having a ply geometry which contributes to improved strength, particularly bending strength, in the structure. Another object is to provide a lightweight elongate composite structural member having high strength. It is also an object to provide a convenient and efficient method of manufacturing such composite structural members. Other objects of the invention will be apparent to those of ordinary skill in the art upon reading the following disclosure.

SUMMARY OF THE INVENTION

The present invention relates to a composite structural member having improved strength. The composite member is generally elongate and may have various cross-sectional profiles such as circular, rectangular, square and the like. The composite is constructed of a number of plies each of which has a fiber component disposed within a polymer matrix. The ply geometry of the present composite structure is such that the inner and outer plies of the structure have continuous, circumferential fibers which are oriented at an angle of between ±30° to ±90° relative to the longitudinal axis of the composite structural member. There is at least one of each inner and outer circumferential plies.

The composite structure also includes at least one intermediate ply having first axially extending fibers in circumferentially spaced sets with circumferential gaps between each set of the first fibers. A set of second axially extending fibers is disposed between each set of first axially extending fibers. These second axial fibers are interwoven with helically oriented fibers which are disposed at an angle of between ±5° and ±60° relative to the longitudinal axis of the composite member. Both the first and second axial fibers are oriented at an angle of approximately 0° to the longitudinal axis of the member. Preferably, each set of first and second axial fibers comprises two adjacent fibers. The first and second axial fibers cooperate to render the wall thickness throughout the composite substantially uniform.

The fibers of the circumferential and braiding fibers may be constructed of a variety of fiber materials, including aramid, carbon, graphite and glass, which have a modulus greater than 10 million psi. The axial fibers may be constructed of fiber materials such as carbon, graphite, ceramic, boron and glass, having a modulus of at least 12 million psi. The polymer resin component of the composite is one which is able to penetrate and bond well to the fiber component and which is compatible with the process of the invention. Preferably this material is a thermoset material such as epoxy or polyester, cured by anhydrides, polyamides or aliphatic amines. In addition, thermoplastic polymer materials such as polyphenylene sulfide, polyethersulfone, polyethylene terephthalate, nylon, polypropylene, polycarbonate, acetal, and polyetheretherketone may be used. The polymer matrix component may also comprise ceramic materials or silicon oxides.

BRIEF DESCRIPTION OF THE DRAWINGS

FIG. 7 is a schematic illustration of a sail mast manufactured from a composite member of the present invention.

FIG. 8 is a simplified schematic view of the method of manufacturing composite structural materials according to the present invention.

DETAILED DESCRIPTION OF THE INVENTION

The composite structural member of the present invention is constructed of a number of plies, each comprising a fiber component disposed in a polymer matrix. The unique ply geometry of the composite contributes to its improved strength. The composite is generally an elongate member which may have a variety of cross sectional shapes, including circular, oval, rectangular, square, polygonal and the like.

Figure 1:
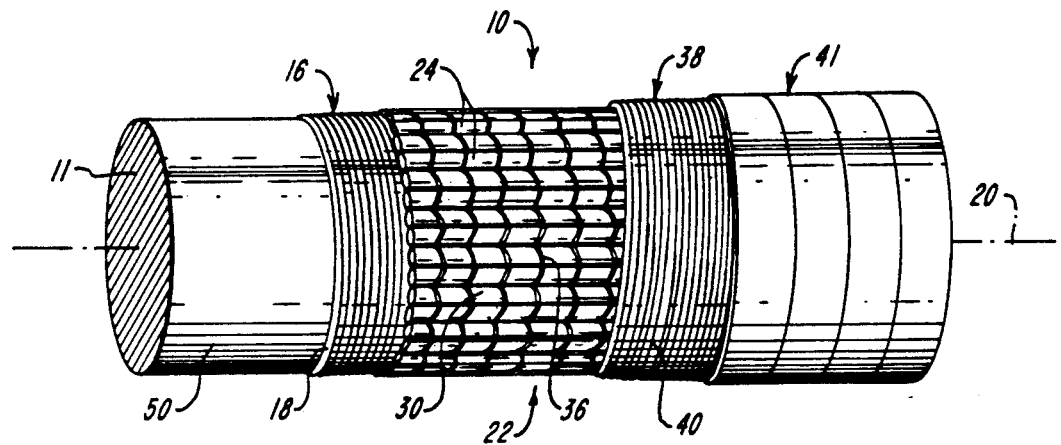
FIG. 1 is a side view, partially broken away, of a composite member of the present invention.
Figure 2:
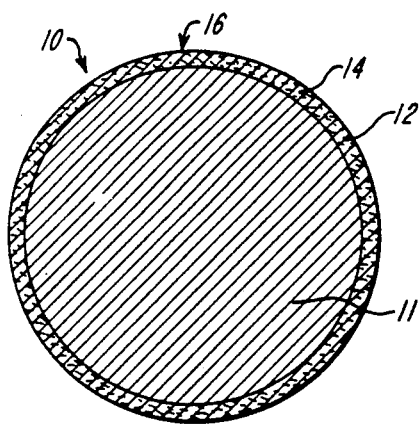
FIG. 2 is a cross sectional view of a partially constructed composite member of the present invention illustrating the innermost ply of the composite.

FIG. 1 illustrates the geometry of the fiber component of the various plies which form the composite member 10 of the present invention. As shown in FIG. 1, the composite member 10 is constructed of a plurality of plies, each of which consists of a fiber component 12 embedded in a polymer matrix 14. The innermost ply 16, which is also illustrated in FIGS. 2 through 5, has a fiber component 18 which is circumferentially oriented at an angle of between ±30° and ±90° to the longitudinal axis 20 of the composite member. The angle of orientation of fiber component 18 is preferably between ±60° and ±90°, and more preferably between ±80° and ±90° relative longitudinal axis 20. In a preferred embodiment fiber component 18 comprises approximately 4 to 10 continuous, unidirectional strands. In the manufacture of sail board masts, for example, fiber component 18 comprises approximately 8 fiber strands. In other embodiments (not shown) fiber component 18 may be braided or woven.

Fiber component 18 may be manufactured from one of a variety of fibers used in the manufacture of composite materials. Preferably, the yarn of fiber component 18 has a modulus greater than 10 million psi. Examples of suitable fiber materials include aramid, carbon, graphite and glass. For most applications, the preferred material is a glass fiber sold under the trademark E-Glass by Owens-Corning. Preferably, the diameter of the yarn of fiber component 18 is in the range of approximately 0.007 to 0.040 inch.

Generally, innermost ply 16 constitutes the only interior ply having a circumferentially extending fiber component. However, where it is desired to achieve stronger, stiffer composite members, more than one ply having circumferentially oriented fibers may be utilized.

Figure 3:
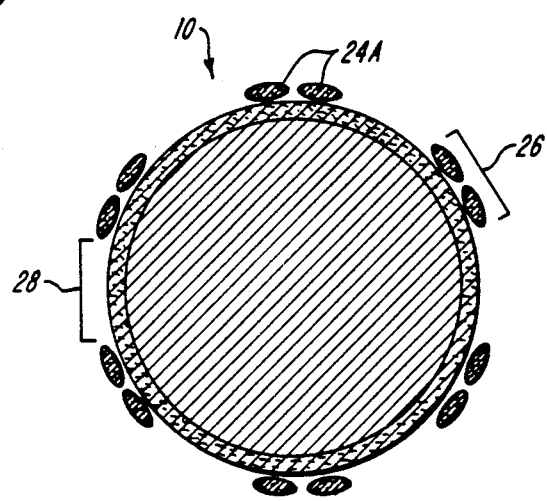
FIG. 3 is a cross sectional view of a partially constructed composite member of the present member illustrating the innermost ply and the first axial fibers of the intermediate ply.
Figure 4:
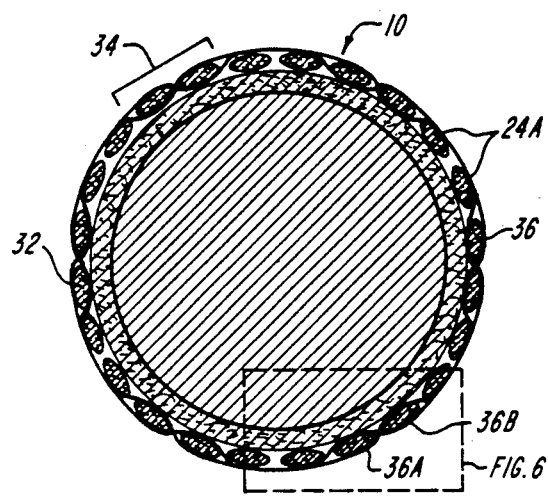
FIG. 4 is a cross sectional view of a partially constructed composite member of the present invention illustrating the innermost and intermediate plies.

One or more intermediate plies are disposed immediately exterior of the inner circumferential ply 16. FIGS. 1 and 3 through 6 illustrate an embodiment in which a single intermediate ply 22 is present. Intermediate ply 22 features two separate axially extending fiber components. A first axially extending fiber component 24 comprises a plurality of unbraided, continuous fibers 24A which, as best shown in FIG. 3, are disposed about the circumference of the composite 10 in sets 26 which are separated by gaps 28. Each individual fiber 24A extends the length of the composite 10 and is oriented at an angle of about 0° relative to the longitudinal axis 20 of the composite. Typically, each set 26 comprises two individual axial fibers 24A which are positioned immediately adjacent each other. Adjacent sets 26 preferably are evenly distributed about the circumference of the composite and separated from each other by a gap 28, the size of which will vary depending upon the desired application. In many applications, a composite structural member made according to this invention will have a wholly or partly tapered diameter, and in such instances the size of gap 28 will uniformly change throughout the length of the tapered portion of the composite 10. The number of individual first axial fibers 24A which make up any given composite will, of course, vary depending on the diameter of the composite and its intended end use. Generally, the number of axial fibers 24A in a given composite will be between 5% and 100% of the number of braided axial fibers 32. For most application, however, the preferred number of axial fiber 24A is between 40% and 100% the number of braided axial fibers 32.

Preferably, non-braided sets 26 of axial fibers 24A are separated from each other by such a distance such that, in conjunction with the braided axial fibers 32, the wall thickness throughout the composite is substantially uniform. For example, to fabricate a 2-inch diameter composite tube having 48 braided axial fibers, such as BASF G30-500 12K, the preferred spacing would be 24 axial fibers 24A (e.g. BASF G30-500 12K fibers) equally spaced in sets of two about the circumference of the composite, with approximately 0.50 inch between sets.

The intermediate ply 22 also comprises a second axial fiber component 30, best illustrated in FIGS. 1 and 3 through 6. The second axial fiber component 30 comprises second, braided axial fibers 32 which are disposed in gaps 28 about the circumference of the composite 10. Like the first axial fibers 24A, the individual second axial fibers 32 are oriented in sets 34 (typically comprising two individual fibers 32 in each set). The number of sets 34 present in any given composite may, in some applications, be equal to the number of sets 26. However, as noted above, there may be as few as 5% axial fibers 24A relative to braided axial fibers 32. Thus, the periphery of the composite 10 comprises generally alternating sets 26, 34 of first and second axial fibers 24, 30 with each fiber of the set being oriented at approximately 0° relative to the longitudinal axis 20 of the composite 20.

Figure 6:
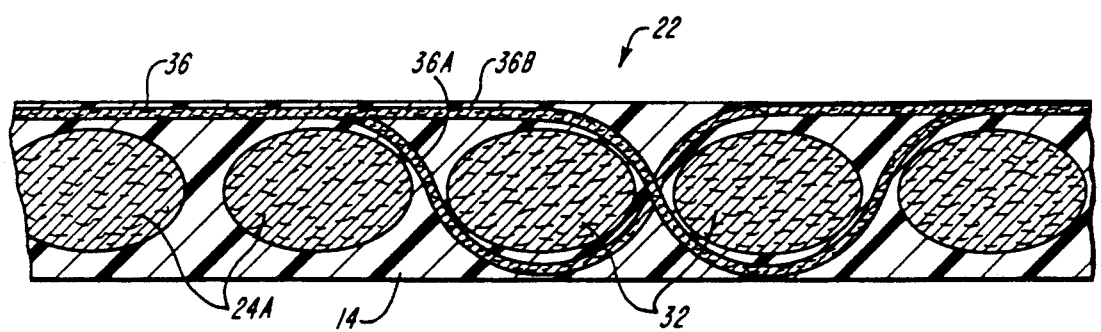
FIG. 6 is a detailed view of the intermediate ply from a portion of FIG. 4.
Figure 10:
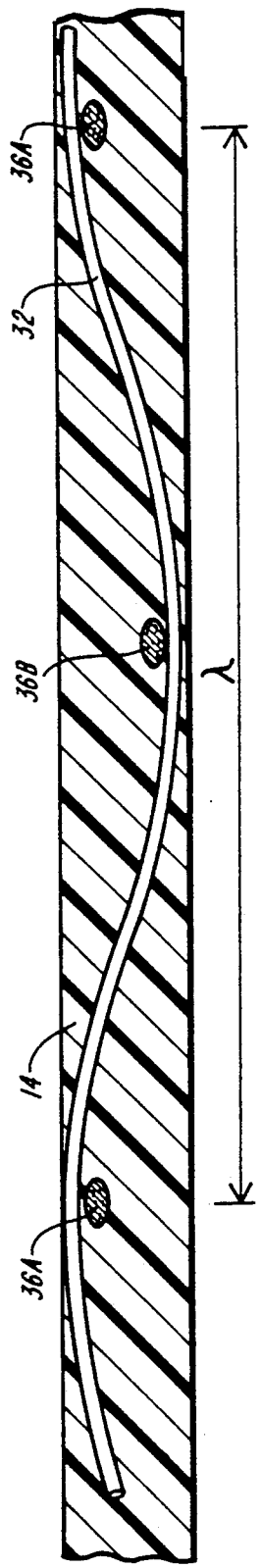
FIG. 10 is a view of the composite section of FIG. 6, rotated 90°, showing one of the braided axial filaments.

The second axial fiber component 30 also comprises a braiding fiber component 36 which has two helically oriented yarn components 36A, 36B. The yarn components 36A, 36B are interwoven with the individual second axial fibers 32 such that each second axial fiber 32 is sandwiched between braiding yarn components 36A, 36B. The braiding yarn components 36A, 36B are not interwoven with first axial fibers 24A, but rather pass over the top surface of fibers 24A as best shown in FIGS. 6 and 10. Each yarn 36A, 36B is a continuous yarn which extends the entire length of the composite 10. Yarns 36A, 36B are preferably oriented at an angle of between ±5° to ±60° relative to the longitudinal axis 20 of the composite 10. The crimp wavelength λ of axial fiber 32, illustrated in FIG. 10, is the distance between two braiding fibers of the same type (e.g., two braiding fibers 36A). The crimp wavelength is generally dependent on the diameter and elastic modulus of the second axial fibers 32 as well as the modulus and strength of the matrix material. Preferably, the crimp wavelength λ is between approximately 0.10 and 1.00 inches.

Preferably, in any given composite, the first and second axial fibers 24A, 34, each have the same diameter and are made of the same materials. The diameter of these axial fibers is dependent on the diameter of the composite, but preferably ranges between 0.007 and 0.040 inch. The first and second axial fibers 24A and 34 may be constructed of any one of a number of fiber materials including carbon, graphite, ceramic, boron, aramid and glass. For most applications, the preferred fiber materials is a carbon fiber having approximately 12,000 filaments per yarn, a yield of approximately 615 yd/lb. (0.807 g/m) and a modulus of at least 30 million psi. An example of such a preferred fiber is that sold under the trademark Celion Carbon Fiber G30-500 12K by BASF. For applications where high strength is required, a preferred material is a carbon fiber, or other fiber material, having a modulus of at least 34 million psi, a maximum stress of 500 ksi and a 1.4% minimum strain.

The braiding yarn components 36A, 36B preferably have a diameter which is smaller than that of axial fibers 24A, 32, and most preferably at least 25% less than that of the axial fibers 24A and 32. The diameter of braiding yarns 36A, 36B thus is in the range of approximately 0.005 to 0.015 inches. The braiding yarn components 36A, 36B may be manufactured of any one of a number of fiber materials including aramid, glass, carbon and graphite. The most preferred material for braiding yarns 36A, 36B is a glass fiber material sold under the trademark S-2 Glass by Owens Corning. These fibers preferably have a modulus of at least 10 million psi and a maximum stress of 600 ksi.

For many applications a single intermediate ply 22 may be used in the manufacture of composite structural members according to this invention. However, it is generally preferred to use more than one layer of ply 22. For example, in the manufacture of sailboard masts three layers of ply 22 are typically used.

Figure 5:
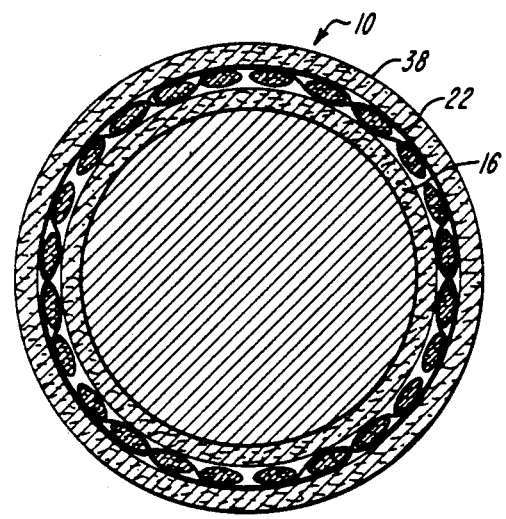
FIG. 5 is a cross sectional view of a composite member of the present invention having inner intermediate and outer plies.

As best shown in FIGS. 1 and 5, an outer ply 38 of fibers is disposed exterior of and immediately adjacent to the intermediate ply 22. The outer ply 38 is also set in a polymer matrix and has a circumferentially oriented fiber component 40. Outer fiber component 40 is preferably oriented at an angle which is the same or similar to that of inner fiber component 18, however, fiber component 40 is wound in a direction opposite to that of fiber component 18. In a preferred embodiment, the outer fiber component 40 has the same diameter as, and is made of the same fiber material as is fiber component 18. Typically, only a single outer ply need be used with a single composite, but more than one outer ply may be used if required for a given application.

The tensile modulus of elasticity for ply 16 outermost ply 38 each contribute less than 25% per ply to the total axial modulus of elasticity (measured in 0° direction) for the composite.

In applications which involve severe external conditions, such as possible impact from debris or other high speed objects, fiber component 18 is preferably a carbon yarn, such as BASF G40-700, having a modulus of approximately 43.5 million psi and a maximum strain of 1.66%. Fiber component 38 is preferably an aramid fiber, such as DuPont Kevlar HT or Kevlar 29, having a maximum stress of at least 500,000 psi and a tensile modulus of at least 12 million psi. For such application the external fiber ply preferably is braided or woven.

As noted above, each of the plies of the present composite member 10 consists of a fiber component 12 disposed in polymer matrix 14. The polymer matrix is typically the same for each ply. In this invention, the polymer matrix 14 is one which is compatible with and capable of penetrating and bonding to the fiber component 12 in order to provide a strong and reliable matrix. Suitable polymer matrix materials include a number of high strength thermoset or thermoplastic polymers which are well known in composite technology. Examples of preferred thermoset polymers include epoxy, vinyl ester and polyester which may be cured by anhydrides, polyamides, aliphatic amines and other known curing agents. Exemplary thermoplastic polymers include materials such as polyphenylene sulfide, polyethersulfone, polyethylene terephthalate, nylon, polypropylene, acetal, and polyetheretherketone. The preferred polymer matrix material is a low viscosity epoxy resin which is cured by an anhydride compound. An example of such a preferred epoxy is sold under the trademark D.E.R. 330 epoxy resin, manufactured by Dow Chemical Company. The most preferred anhydride curing agents for such epoxy resins are methyl tetrahydrophthalic anhydrides.

Figure 9:
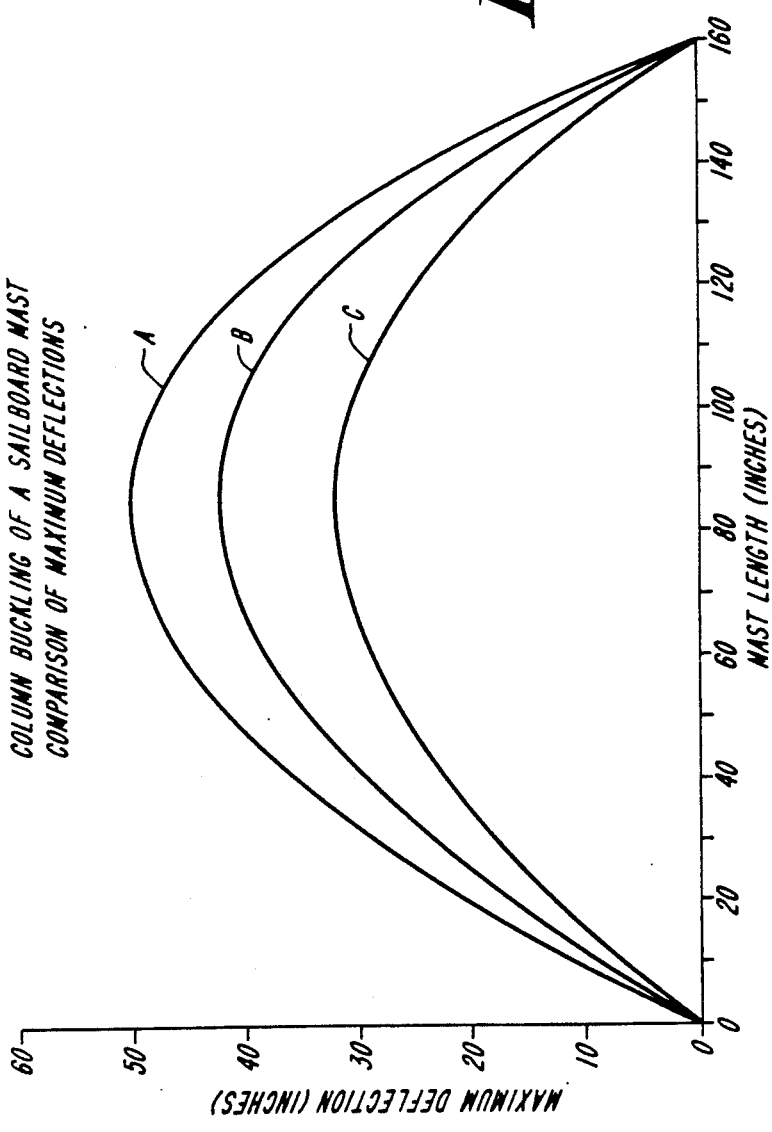
FIG. 9 is a graph of maximum bending deflection vs. composite length for various composite constructions.

One particular advantage of the ply structure of the present composite structural member is that the ply geometry of the intermediate ply 22 results in a substantially uniform wall thickness throughout the composite 10. The first axial fiber component 24 is present in the composite to eliminate gaps between sets 34 of second axial fibers which would be present in the absence of fiber component 34. Such gaps, if they did exist, would result in surface irregularities which would tend to decrease the bending strength of the composite. FIG. 9 is a graph which plots maximum deflection against composite length for a composite manufactured according to the present invention and other constructions. Curve A represents the bending strength of a composite manufactured according to the present invention and clearly illustrates the increased bending strength achieved by the present constructions. Curve B represents the bending strength of a similar composite which was constructed without first axial fiber component 24. Curve C depicts the bending strength of a composite similar to that shown in curve A, except that it was constructed without circumferential plies 18 and 38, and axial fiber 24.

As a result of a more uniform wall thickness, composites manufactured according to the present invention have an increased bending strength. Moreover, the interlaminar bonding of the plies is improved due to the Z-direction component of the braiding fibers 36 which contributes to the improved strengths of these composites. Stresses in the matrix are also reduced (in comparison to other braided or woven structures) by reduced crimp in the high modulus axial fibers. The increased bending strength of these composite members is also achieved without any significant increase in the weight of the composite. Consequently, the combination of high strength and light weight of such composites renders these materials useful for a variety of applications.

These composites are particularly well suited for articles which must withstand bending strains greater than 0.25%. Accordingly, these composite structural members find use in many recreational applications including the manufacture of ski poles, yacht spars, golf club shafts, pole vault poles, fishing rods, fishing outriggers, oar shafts, paddle shafts, hockey stick shafts, baseball bats, glider structures and many other applications where light weight and high strength, particularly high bending strength are desirable. Such composite materials may also find use in structural tubing and piping. In addition, these materials may be used in the manufacture of landing struts for aircraft, other aircraft structures, tubular housings, relief springs and robotics. These materials may also be used in the manufacture of housings for communication antennas and marine superstructures as well as for medical accessories such a wheelchairs, canes, stretchers and prosthetics. Perhaps among the most preferred application of these composites is as mast structures for sailboats and sail boards.

FIG. 7 illustrates a spar 42 which may be used in the manufacture of a sail mast (such as a sailboard mast) which may be manufactured using the technology described above. The spar 42 comprises an upright tubular structure 44 which is used to support a sail (not shown). The spar 42 is made from a composite of the type described above, having a single inner ply, approximately three intermediate plies and an outer ply (not shown). The diameter of post 44 is constant throughout about one-half of the length of the spar, and is uniformly tapered throughout the remaining length of the spar. Preferably, the diameter in the tapered portion of the spar ranges from approximately 2.0 to 0.85 inches. In addition to the plies which comprise post 44, the spar 42 also may have a coating of polyurethane (not shown). The coating may include UV absorbing additives to protect the matrix material from degrading upon exposure to sunlight.

In order to resist excessive localized bending forces, such as those which result from the presence of a boom (not shown), the spar 42 may feature a reinforced boom region 46. As shown in FIG. 7, the post 44 is reinforced over a length of approximately 40 inches to accommodate a variety of boom positions and sail designs. The reinforced boom region 46 preferably comprises an external wrap of about 8.75 ounce per yd² of a woven glass fabric (e.g., E-Glass) which is saturated with resin and which is bonded to the spar with compacting tape. The reinforced area 46 typically adds an additional 0.015 inches to the wall thickness of the composite. Without reinforcement, the wall thickness of the composite in the boom region 46 is approximately 0.065 inch. The effect of the reinforced boom region is to increase the circumferential stiffness of the spar so that it can better withstand the point loading which is caused by the attachment of a boom to the spar. The woven reinforcing fabric 46 is also able to better withstand and distribute point loading than a layer of non-interlaced fibers of the same types and ply thickness. Although illustrated in FIG. 7, and useful for some applications, a reinforced boom region 48 is not necessary for all sail masts manufactured from a composite made according to the present invention.

With reference to FIG. 8, which illustrates a composite assembly apparatus 49, the manufacture of a composite material according to this invention may be described as follows. The various plies which make up the composite structural members of this invention are wrapped around a mandrel or form 50, the general shape of which is assumed by the composite. Mandrels 50 which are useful in the manufacturing process of this invention may be tapered or nontapered and the mandrel may be fabricated from such materials as aluminum, steel, plastic, rubber or other suitable materials. Although the mandrel may be either hollow or solid, a hollow mandrel is preferred.

Referring again to FIG. 8, a mandrel 50 is positioned within a composite manufacturing line to traverse through a series of stations which apply and wrap various fibers and polymer matrix ply layers about the mandrel 50. The mandrel 50 initially encounters station 52, which applies the fibers 18 which comprise inner ply 16. Station 52 may consist of an apparatus holding multiple packages 54 of yarn (e.g., four to eight packages) which rotate in an axis perpendicular to the direction of the traverse 56 of the mandrel 50. The speed of the rotation (rpm) of stations 52, relative to the rate of the mandrel 50 traverse, determines the amount and orientation of the fibers in inner ply 22. For example, in the manufacture of a sailboard mast, the mandrel 50 traverses the assembly apparatus 49 at a speed of about 4 ft. per minute, while the eight yarn packages of station 52 rotate at a varying speed of between 40 and 175 rpm, depending upon specific design requirements and the diameter of the composite at a given region. Immediately following station 52, a liquid polymer resin (such as epoxy) is applied through an apparatus 58A which immerses and saturates the entire inner ply 16. The ratio by volume of resin to fiber is preferably about 50% or less.

As the mandrel 50 continues to traverse the assembly apparatus 49, it next encounters filament wrapping station 60, which applies a first intermediate ply. Yarn packages 62A apply first axial fiber 24 while yarn packages 62B apply axial fiber 32. Braiding yarn components 36A and 36B are applied at station 60 through a braiding apparatus (not shown). The number of yarn packages 62A and 62B preferably corresponds to the number of axial fibers 24, 32 present in each ply. Resin applicator 58B also forms part of station 60, as it applies additional resin to form the matrix of the first intermediate ply.

Filament wrapping stations 61 and 64 apply second and third intermediate plies, respectively, in a manner similar to that described above. Resin applicators 58C and 58D cooperate with stations 61 and 64 to add additional matrix-forming polymer resin.

The mandrel 50 is next passed through filament wrapping station 66 which is identical to station 52. Station 52 applies outer ply 38 in the same manner as station 52, except that station 66 rotates in a direction opposite to that of station 52. Following the application of this circumferential layer, additional resin material is applied to the composite by apparatus 58E. If desired, additional stations (not shown) may apply additional circumferential layers which will subsequently be coated with resin.

In each filament wrapping station, the fiber tension is controlled such that the fibers remain taut, without looseness or displacement of the fibers after application. The tension of the braiding fibers 36 is controlled by a braiding machine apparatus which maintains a tension of about 1 lb. or less per fiber.

Finally, the mandrel 50 is passed through a tape winding device 68 which applies thermoplastic tape 41 (e.g., having a width of about ½ to ¾ inch) about the mandrel 50 and its plies. The tape tension is preferably kept at between 3 and 15 pounds. The tension in the tape serves to compact the filament and resin which has been wound about the mandrel and forces out excess resin and most of the air which is trapped between the filaments and the resin. An example of a type of tape which is especially useful in the manufacture of sailboard masts is ½ inch wide silicon coated polyester film having a thickness of two mils.

Drive mechanism 70 is typically utilized to advance the mandrel 50 along the assembly apparatus 49. Preferably this mechanism is capable of varying the rate at which mandrel 50 traverses assembly station 49.

After the application of the thermoplastic tape, the entire structure may be placed in a vertical convection oven at approximately 300° F. for about two hours to cure the resin. The structure may then be removed from the oven and allowed to cool. Following this step, the mandrel 50 is extracted from the cured composite. Extraction of the mandrel may require in excess of 1000 lbs. of pull due to the shrinkage of the composite when the resin changes from liquid to solid form. Following this step, the thermoplastic compaction tape is removed from the laminate by a simple unwinding process.

Following the removal of tape, the composite may be processed in a sanding apparatus which removes glass from cured resin and makes uniform the outside diameter of the composite to prepare it for polyurethane coating. These sanding steps are particularly applicable in the manufacturing of sail board masts.

What is claimed is:

1. In a sail mast for a wind-powered sail craft, said mast having means for securing the mast to the sail craft and means for securing a sail to the mast, the improvement comprising a multiple-ply composite structure of fibers and a polymer matrix having A. at least one inner ply having circumferentially extending fibers disposed in a polymer matrix,
B. at least one intermediate ply having
  (i) first axially extending fibers in circumferentially-spaced sets with circumferential gaps between each set of the first fibers, (ii) second axially extending fibers in circumferentially-spaced sets disposed in said circumferential gaps, C. helically-oriented fibers interwoven with only one of said sets of first or second axially-extending fibers, and D. an outer ply having circumferentially extending fibers.

2. In a sail mast according to claim 1, the further improvement comprising a reinforcing ply of fibrous material in a polymer matrix disposed over said outer ply in a boom-engaging region of the mast for selectively increasing the strength of said composite structure in said boom-engaging region.

3. In a sail mast according to claim 2, the further improvement in which the diameter of said composite structure at said outer ply has a maximum diameter in the order of two inches and said reinforcing ply has a radial thickness in the order of approximately fifteen thousandths of an inch.

4. In a sail mast according to claim 1, the further improvement in which said fibers of said inner and outer plies extend in opposite circumferential directions.

5. In a sail mast for a wind-powered sail craft, said mast having means for securing the mast the improvement comprising to the sail craft and means for securing a sail to the mast, a multiple-ply composite structure of fibers and a polymer matrix having A. at least one inner ply having circumferentially extending fibers disposed in a polymer matrix, B. at least one intermediate ply having
   (i) first axially extending fibers in circumferentially-spaced sets with circumferential gaps between each set of the first fibers,
   (ii) second axially extending fibers in circumferentially-spaced sets disposed in said circumferential gaps, C. helically-oriented fibers interwoven with at least one said set of axially-extending fibers, and D. an outer ply having circumferentially extending fibers.

* * * * *

UNITED STATES PATENT AND TRADEMARK OFFICE
CERTIFICATE OF CORRECTION

PATENT NO. : 5,048,441
DATED : September 17, 1991
INVENTOR(S) : Peter A. QUIGLEY It is certified that error appears in the above-identified patent and that said Letters Patent are hereby corrected as shown below:

Claim 5, column 10, lines 4-21, should read --In a sail mast for a wind-powered sail craft, said mast having means for securing the mast to the sail craft and means for securing a sail to the mast, the improvement comprising a multiple-ply composite structure of fibers and a polymer matrix having A. at least one inner ply having circumferentially extending fibers disposed in a polymer matrix, B. at least one intermediate ply having
(i) first axially extending fibers in circumferentially-spaced sets with circumferential gaps between each set of the first fibers,
(ii) second axially extending fibers in circumferentially-spaced sets disposed in said circumferential gaps, C. helically-oriented fibers interwoven with at least one said set of axially-extending fibers, and D. an outer ply having circumferentially extending fibers.--

Signed and Sealed this

Twentieth Day of September, 1994

Attest:

BRUCE LEHMAN

*Attesting Officer*    *Commissioner of Patents and Trademarks*